United States Patent [19]

Looper

[11] 4,095,098

[45] June 13, 1978

[54] RATIOMETRIC TRANSPARENCY METER

[76] Inventor: Norman G. Looper, 7969 Engineer Rd., San Diego, Calif. 92111

[21] Appl. No.: 769,635

[22] Filed: Feb. 17, 1977

[51] Int. Cl.$^2$ ............................................. G01J 1/32
[52] U.S. Cl. ..................................... 250/205; 250/575; 356/206
[58] Field of Search ............... 250/205, 204, 209, 210, 250/574, 575; 356/201, 204, 205, 206, 207, 208

[56] References Cited

U.S. PATENT DOCUMENTS

| | | | |
|---|---|---|---|
| 3,629,589 | 3/1970 | Gleixner et al. | 250/205 |
| 3,652,850 | 3/1972 | Briggs | 356/206 |
| 3,698,820 | 10/1972 | Hanff et al. | 356/206 |

*Primary Examiner*—David C. Nelms
*Attorney, Agent, or Firm*—Henri J. A. Charmasson

[57] ABSTRACT

In the control and measurement of opacity, turbidity, thickness and other factors affecting the transmission of light a ratiometric method and apparatus for measuring the transparency of a specimen by comparison to a reference specimen, wherein electronic technology is used for controlling the intensity of one light source in relation to another without using any mechanically moving parts. The invention can be applied to the regulation of any two voltage controlled energy sources used in the ratiometric measurement of physical or chemical parameters.

10 Claims, 8 Drawing Figures

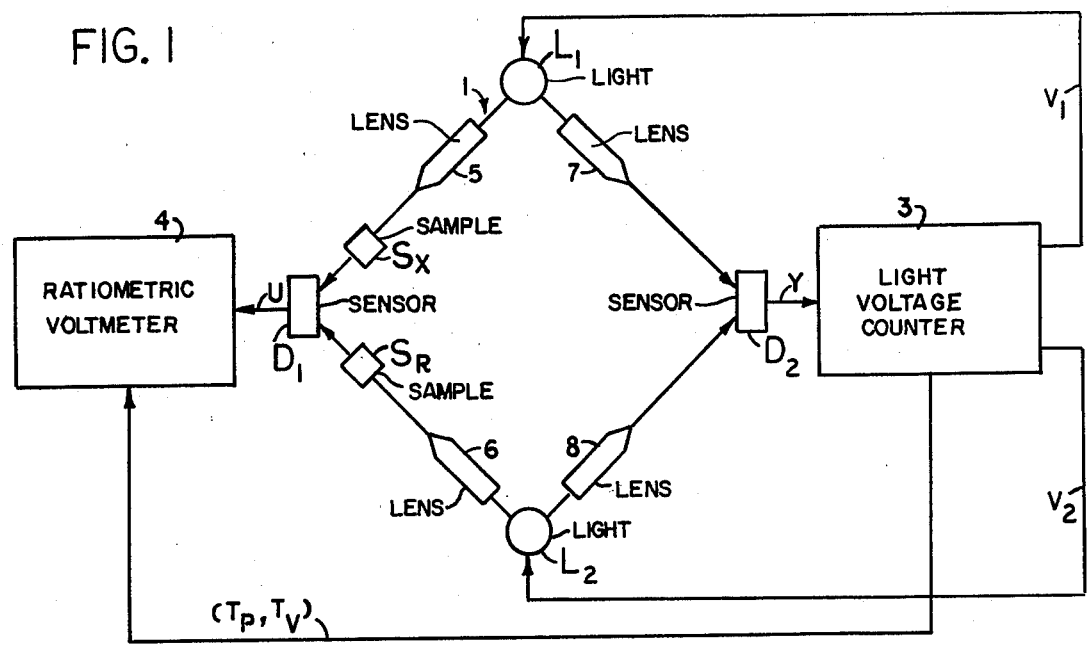
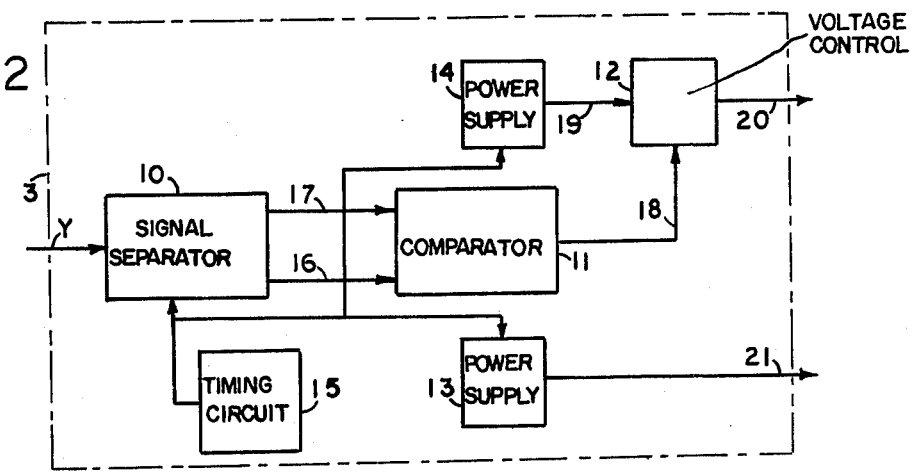
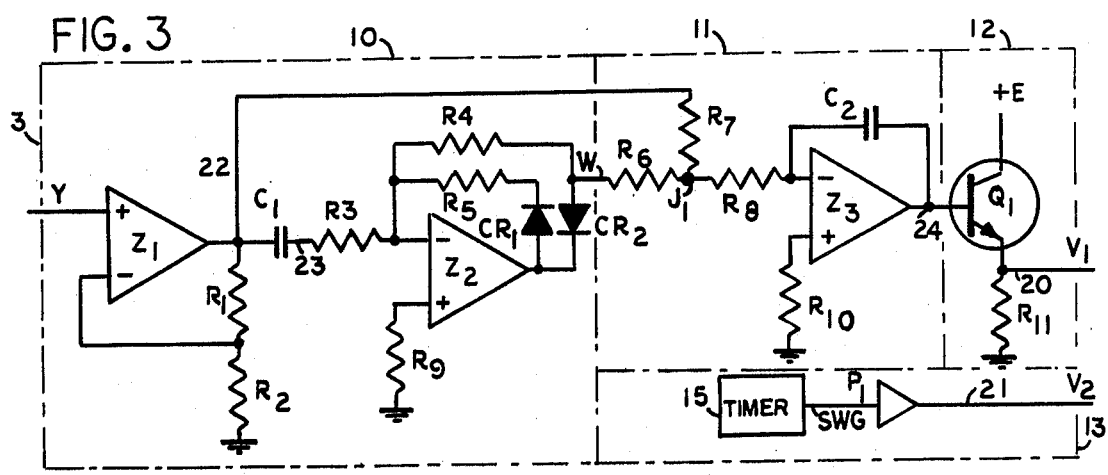

RATIOMETRIC TRANSPARENCY METER

BACKGROUND OF THE INVENTION

Ratiometric measurement techniques are favored in the measurement of various parameters affecting the transmission of light through a particular milieu. These techniques provide the stability and accuracy necessary to detect minute changes of conditions solely in the milieu divorced from changes in the optical apparatus with time and temperature.

It has been found convenient to subject the reference specimen and the unknown specimen to separate light sources of difference types, but matched intensity.

For instance, the unknown specimen can be exposed to a steady light source while the known specimen is subjected to a flashing light. The light beams transmitted through both specimen are then combined and measured and through a common optical device. The intermittent character of the resulting signal obtained from the flashing light source facilitates its separation from the continuous output signal corresponding to the steady light source, and allows the development of ratiometric information to automatically compensate for spurious apparatus variations such as light intensity, photocell sensitivity, and amplifier gain.

The two light sources are usually generated from a common one which has been split by prismatic refraction. The flashing light is usually obtained by interposing a vibrating mechanical chopper, or perforated rotating disk, in the path of one of the twin light sources. Such mechanical systems are often cumbersome and difficult to maintain in good running order.

SUMMARY

The present invention provides a method and means for ratiometrically measuring the transparency of a specimen by comparison to the transparency of another specimen having a known transparency factor without using any mechanically moving device.

The principal object of the invention is to provide a means for instantaneously comparing lights transmitted through two different specimens subjected to electronically matched light sources.

Another object of the invention is to use an electronic means for controlling the intensity of a steady light source in arbitrary fixed ratio to the intensity of a flashing light source.

A further object of the invention is to provide an electronic means for generating a flashing light source having an intensity proportional to the intensity of a continuous light source.

Another object of the invention is to generate said light source by photo-electrical means.

According to the teachings of the present invention a continuous light source and a flashing one (used in the ratiometric measurement of light transparency) are measured through a common photo-electrical system and the intensity of one is electronically locked to the intensity of the other.

The apparatus and technique disclosed in this specification can be applied to the measurement of any physical or chemical parameter in response to the effect of any other type of phenomenon such as Xrays, infrared, sound waves, upon a particular milieu under scrutiny.

DRAWING

FIG. 1 is a block diagram illustrating the basic components of the invention applied to an electro optical measurement;

FIG. 2 is a block diagram illustrating the functional element contained in block 3 of the block diagram shown in FIG. 1;

FIG. 3 is an electrical circuit diagram illustrating a first implimentation of the elements contained in block 3 shown in FIGS. 1 and 2;

DESCRIPTION OF THE PREFERRED EMBODIMENTS OF THE INVENTION

Figure 4:
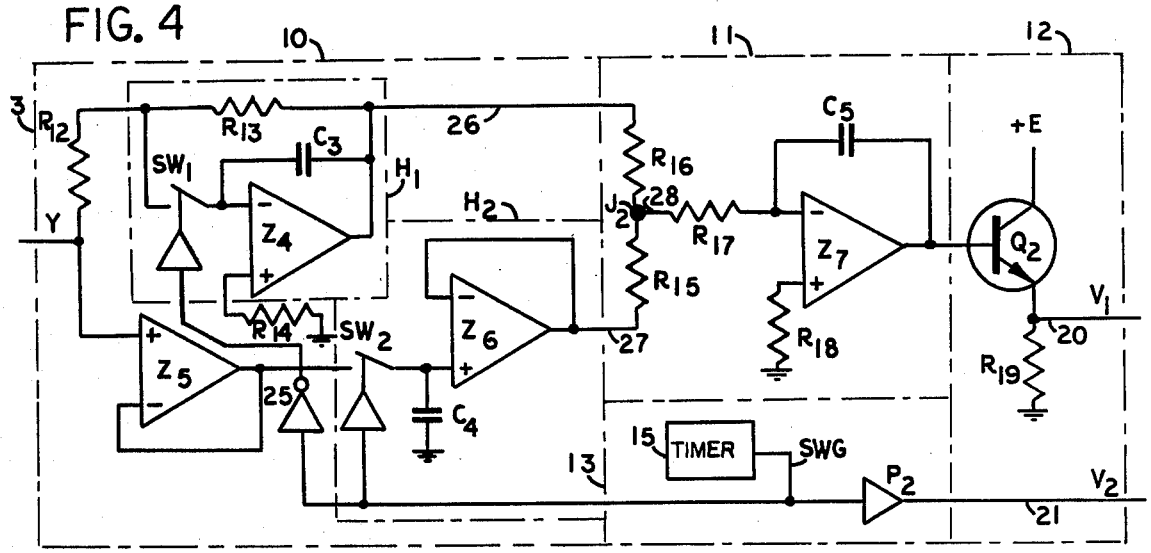
FIG. 4 is an electrical circuit diagram illustrating a second implimentation of the elements contained in block 3 shown in FIGS. 1 and 2.

Referring now to FIG. 1 of the drawing, there is shown the block diagram of an apparatus applied to the measurement of light transparency.

The apparatus comprises a four-terminal electro-optical network 1 formed by $L_1$, $L_2$, $D_1$, $D_2$.

$L_1$ and $L_2$ are two light sources, the candle-powers of which are porportional to the amplitudes of the voltage signals $V_1$ and $V_2$ respectively applied to them. These light sources may be implicated with incandescent bulbs, light emitting diodes or any other type of light source, the intensity of which can be voltage controlled.

$D_1$ and $D_2$ are two light sensors such as photo-cells or photo-multipliers or other types of light detectors, having electrical output signals U and Y respectively proportional to the amount of light received on their sensing surfaces. Sensor $D_1$ is exposed to the effects of both light sources $L_1$ and $L_2$ which are focused upon its sensing surface by collimating lenses 5 and 6 respectively. Sensor $D_2$ is similarly exposed to the effects of both light sources $L_1$ and $L_2$ which are focused upon its sensing surface by collimating lenses 7 and 8.

A sample $S_x$, whose transparency to light $T_x$ is to be measured, is inserted between $L_1$ and $D_1$. A reference sample $S_R$, of known transparency $T_R$, is inserted between $L_2$ and $D_1$.

In such a arrangement the effect of $L_1$ upon $D_1$ is proportional to the transparency $T_X$ of the milieu constituted by $S_X$. Similarly the effect of $L_2$ upon $D_1$ is proportional to the transparency $T_S$ of the milieu constituted by $S_R$.

Block 3 represents an electrical circuit which generates the voltages signal $V_1$ and $V_2$ powering $L_1$ and $L_2$ respectively.

Block 2 represents a ratiometric voltmeter capable of measuring the amplitude of the output signal $U_{T_P}$ of $D_1$ during a certain period of time $T_P$ in relation to the amplitude of $U_{T_V}$ during a alternate period of time $T_V$, whereby the resulting reading is equal to:

$$U_{T_P}/U_{T_V}$$

Such a ratiometric voltmeter may be implimented with a dual-sloped integrating voltmeter or any other adequate ratiometric measurement apparatus which are well known to the persons skilled in the electrical arts.

In these embodiments of the invention the timing signals $T_P$ and $T_V$ controlling the measuring operations are generated by the electrical circuit contained in the lights control circuit of block 3.

The lights control circuit of block 3 regulates the intensity of $L_1$ and $L_2$ by keeping $V_1$ and $V_2$ proportional to one another. Furthermore, one of the light sources $L_1$ or $L_2$ is powered only during the time period $T_P$ while the other is powered during both time periods $T_P$ and $T_V$.

If $L_1$ is powered during $T_P$ only and $L_2$ powered during $T_P$ and $T_V$ it can be understood that the transparency $T_X$ of the setting constituted by milieu $S_X$ is proportional to the effect of $L_1$ upon $D_1$ during $T_P$. While the transparency $T_R$ of the setting constituted by the milieu $S_R$ is proportional to the effect of $L_2$ upon $D_1$ during $T_P$ and $T_V$. Since during $T_V$ only $L_2$ is powered, $U_{T_V}$ is proportional to $T_R$; while $U_{T_P}$ which occurs during the time when both light sources are powered is proportional to $T_R + T_X$, these relationships can be expressed as follows:

$$(T_X + T_R / T_R) = (U_{T_P}/U_{T_V})$$

If the transparency $T_R$ of the sample milieu $S_R$ is known, the transparency $T_X$ of the unknown milieu $S_X$ can be derived from the meter 3 readout by the formula $$T_X = (U_{T_P} T_R / U_{T_V}) - T_R$$

The regulation of the voltage controlled light sources $L_1$ and $L_2$ is accomplished by the circuit contained in block 3 in response to the effects of $L_1$ and $L_2$ upon $D_2$. Therefore, any change of condition such as light or temperature which would affect the $L_1$, $D_1$, $L_2$ side of the measurement network 1 would also affect its $L_1$, $D_2$, $L_2$ side, and would be automatically cancelled. Similarly loss of intensity in $L_1$ and $L_2$ and loss of sensitivity in $D_1$ and $D_2$ due to wear and use are automatically compensated. This measurement technique provides the stability and accuracy necessary to detect minute changes of conditions in the sample milieu $S_X$.

Although for the sake of explanation $L_1$ and $L_2$ have been defined as light sources, it should be understood that any voltage controlled energy source could have been employed such as sources of heat, xrays, sound or pressure with appropriate sensors for $D_1$ and $D_2$.

The parameter sought to be determined in $S_X$ could be thickness, turbidity or any other physical or chemical factor responsive to the energy sources $L_1$ and $L_2$, without deviating from the scope of the invention.

The operation of the light control circuit is described in more detail below.

Referring now to FIG. 2 there is shown a functional block diagram of the voltage controlling circuit contained in block 3, which regulates $V_1$ and $V_2$ in function of the output signal Y of $D_2$.

Block 10 represents a circuit which separates the input signal Y into two signals 16, 17. The first signal 16 is proportional to the amplitude $Y_{T_P}$ of Y during the time $T_P$ when both $L_1$ and $L_2$ are powered. The second signal $Y_{T_V}$ is proportional to the amplitude of Y during the time $T_V$ when only one of the energy sources $L_1$ or $L_2$ is powered.

Block 11 represents a circuit through which signals 16 and 17 are compared.

Blocks 13 and 14 are two voltage power supplies. The output 21 of block 13 is directly applied to one of the energy sources $L_1$ or $L_2$, while the output 20 of block 14 is run through a voltage controlling circuit, contained in block 12, which is responsive to the output signal 18 of block 11. The regulated output 20 of block 12 is then applied to the other energy source. Block 15 represents a timing circuit which generates two signals corresponding to the measurement periods $T_P$ and $T_V$.

Figure 6:
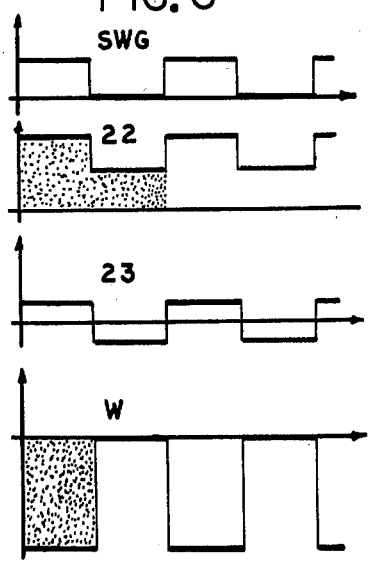
FIG. 6 illustrates waveforms present in the circuit shown in FIG. 3.

Three alternate implimentations of the circuit contained in block 3 are described below. FIGS. 3 and 6 illustrate a first implimentation.

There is shown a square-wave generator 15 which generates a signal SWG having a peak period $T_P$ and valley period $T_V$. This signal SWG is applied through driver $P_1$ to generate an intermittent voltage control signal 21 used as $V_2$ to control power source $L_2$.

The separating circuit comprises the components in block 10, the comparator circuit is constituted by the components in block 11 and the voltage controlling circuit is implimented with the components in block 12.

The input signal Y is first applied to a buffering noninverting amplifier $Z_1$, the gain of which can be adjusted by appropriately selecting the values of resistors $R_1$ and $R_2$. The resulting output signal 22 has a maximum output amplitude proportional to the output signal amplitude $Y_{T_P}$ of sensor $D_2$ during the peak period $T_P$ of $V_2$. The minimum amplitude of signal 22 is proportional to the output signal amplitude $Y_{T_V}$ of sensor $D_2$ during the valley period $T_V$ of $V_2$.

Signal 22 is differentiated through capacitor $C_1$ and $R_3$. The resulting signal 23 corresponds to the effect of intermittent power source $L_2$ upon $D_2$, i.e. $Y_{T_P} - Y_{T_V}$. The value of $C_1$ and $R_3$ are chosen so that the period determined by $C_1 \times R_3$ is approximately equivalent to 10 $T_P$ for best results.

Signal 23 is then amplified through inverting amplifier $Z_2$ which has a gain $G_1$ equal to $-6$. Amplifier $Z_2$ has two independant feed-back loops. A positive excursion feed-back loop constituted by diode $CR_1$ and resistor $R_5$; and a negative feed-back loop constituted by diode $CR_2$ and resistor $R_4$.

The signal W at the junction of $R_4$ and $CR_2$ has a maximum positive excursion during $T_P$ equal to zero, and a maximum negative excursion during $T_V$ equal to three times the amplitude of signal 23, that is to say: 3 $(Y_{T_P} - Y_{T_V})$.

Signals 22 and W are then compared by applying them to the summing junction J, through resistors $R_7$ and $R_8$ respectively. The summed result is applied to integrating amplifier $Z_3$.

The resulting signal 24 is used to control a cathode-follower circuit $Q_1$, fed by a DC power supply E, the output of which 20 is thus controlled by the amplitude of signal 24.

The operation of the above-described circuit can be best understood by comparing the waveforms of signals 22 and W during each cycle of the clocking signal SWG.

When the output energy of the two power sources $L_1$ and $L_2$ are balanced the volt-time areas defined by the two curves are equal and opposite. Since the two waveforms 22 and W are summed through $R_6$ and $R_7$, if $R_6$ equals $R_7$ the average current into $J_1$ is zero. Thus the integrator $Z_3$ will respond to any unbalance between the two signals 22 and W, i.e. between the effects of the two power sources $L_1$ and $L_2$ upon $D_2$.

The resistor $R_6$ (or $R_7$) can be made into a rheostat to provide an adjustment of the system for less than ideal component behavior, or to achieve the desirable power ratio between $L_1$ and $L_2$.

Note that the overall feed-back of the system is negative and that the loop is closed by the effect of $L_2$ upon $D_2$.

Figure 7:
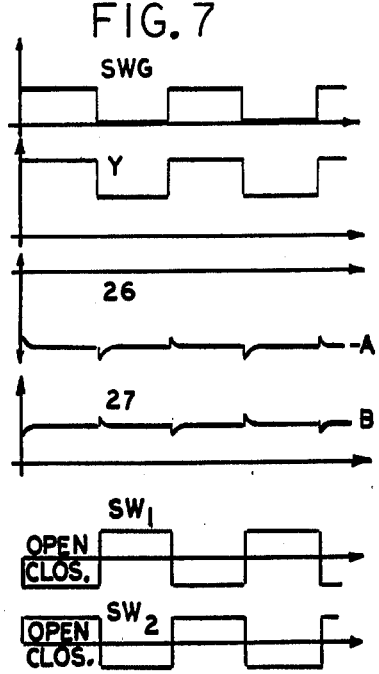
FIG. 7 illustrates waveforms present in the circuit shown in FIG. 4.

A second implimentation of the circuit contained in block 3 is illustrated in FIGS. 4 and 7.

The circuitry necessary to separate the signal Y in two components is located in block 10. The comparator circuit is contained in block 11. The circuitry necessary to control $V_1$ is formed by the components in block 12.

Capacitor $C_3$ constitutes a sample-and-hold circuit $H_1$ associated with inverting operational amplifier $Z_4$. The input signal Y is applied to $C_3$ through a switch SWI which is driven by the square-wave signal SWG derived from signal generator 15. An invertor 25 cause SWI to close only during the peak period $T_P$ of SWG. Since the signal SWG is also used to generate $V_2$ which drive one of the energy sources $L_2$, through driver $P_2$, the negative output signal 26 of $Z_4$ has an amplitude A proportional to the output signal amplitude $Y_{T_P}$ of $D_2$ during the peak period $T_P$ of $V_2$.

Capacitor $C_4$ forms a sample-and-hold circuit $H_2$ associated with a non-inverting operational amplifier $Z_6$. The input signal Y is applied to $C_4$ through buffer amplifier $Z_5$ and switch $SW_2$ which is driven by signal SWG. Switch $SW_2$ closes during the valley period $T_V$ of SWG and $V_2$. The output signal 27 of $Z_6$ has a amplitude B proportional to the output signal amplitude $Y_{T_V}$ of $D_2$ during the valley period $T_V$ of $V_2$.

The two signals 26 and 27 are then compared through resistors $R_{15}$ and $R_{16}$ in the summing junction $J_2$. If the value of $R_{16}$ is twice the value of $R_{15}$ it follows that the resulting signal 28 is proportional to $B - \frac{1}{2} A$.

Signal 28 is then fed to an operational integrating amplifier $Z_7$. The output of $Z_7$ is then used to control the voltage signal $V_1$ through $Q_2$ in a manner similar to that described previously in the first implimentation.

If the effects of both energy sources upon $D_2$ are equal the negative amplitude A of signal 26 will be twice as much as the positive amplitude B of signal 27. The resulting summed signal will be equal to zero. Thus the integrator $Z_7$ will respond to any unbalance between the two signals 26 and 27, i.e. between the effect of the two power sources $L_1$ and $L_2$ upon $D_2$.

The value of $R_{16}$ and $R_{17}$ can be selected for proper balance of the system or for achieving the desirable power ration between $L_1$ and $L_2$.

Figure 5:
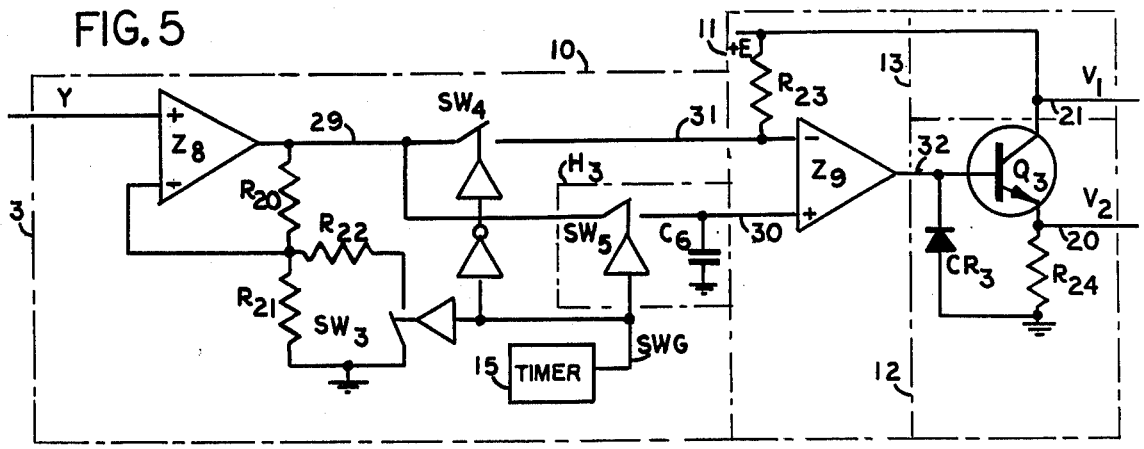
FIG. 5 is an electrical circuit diagram illustrating a third implimentation of the elements contained in block 3 of FIGS. 1 and 2.
Figure 8:
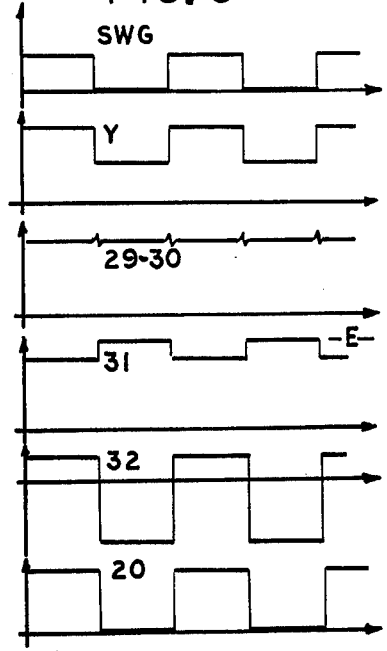
FIG. 8 illustrates waveforms present in the circuit shown in FIG. 5.

A third version of the circuit contained in block 3 is illustrated in FIGS. 5 and 8.

In this implimentation a continuous voltage $V_1$ is applied directly to one of the power sources $L_1$ and a intermittent voltage $V_2$ is derived from a squarewave generator 15 and controlled so as to keep it proportional to the effect of $L_1$ upon $D_2$.

The signal derived from $D_2$ is separated into two signals 30 and 31 by the element contained in block 10. Block 11 comprises the comparating network. The signal controlling circuit is illustrated in block 12.

The input signal Y derived from $D_2$ is applied to a dual gain operational amplifier $Z_8$. The feed-back loop characteristics of $Z_8$ can be altered by closing switch $SW_3$, which places $R_{22}$ in parallel with $R_{21}$. Switch $SW_3$ closes during the valley period $T_V$ of SWG. Resistors $R_{21}$ and $R_{23}$ are selected so that the gain $GT_P$ of $Z_8$ during $T_P$ is equal to half the value of the gain $GT_V$ of $Z_8$ during the valley period $T_V$ of SWG.

Capacitor $C_6$ constitutes a sample-and-hold circuit $H_3$ which through $SW_5$ is connected to the output signal 29 of $Z_8$ only during the period $T_V$, and disconnected during $T_P$. The resulting signal 30 at the output of $H_3$ is then applied to the non-inverting input of an operational amplifier $Z_9$. The output signal 29 of $Z_8$ is also ocnnected to the inverting input of operational amplifier $Z_9$ through switch $SW_4$.

Switch $SW_4$ closes only during the peak period $T_P$ of signal SWG. The inverting input of $Z_9$ is also connected to a positive voltage supply source E through resistor $R_{23}$. In the absence of $Z_9$ the resulting signal 31 between $SW_4$ and $R_{23}$ would vary between E, when $SW_4$ is open, and a value proportional to one half times the peak amplitude $Y_{T_P}$ of Y; while the signal 30 would correspond to the minimum amplitude $Y_{T_V}$ of Y during $T_V$. The operational amplifier $Z_9$, however, acts as both a comparator between signals 30 and 31 and a regulator so that signal 30 and 31 are kept at the same level by appropriate feed-back control as is explained below.

The output signal 32 of $Z_9$ is a square-wave which falls below the common level when $Z_9$ is under saturation during $T_V$, when $SW_4$ is open. When $SW_4$ closes during $T_P$, signal 31 drops the value of signal 29. Amplifier $Z_9$ goes out of saturation and applies a positive signal to the base of the cathode-follower circuit $Q_3$. The square-wave signal 20 at the output of $Q_3$ is used as $V_2$ to drive the energy source $L_2$.

The diode $CR_1$ acts as a clamp to protect $Q_3$ when the output of $Z_9$ slews negatively.

The operation of the system is better understood when one realizes that the elements $Q_3$, $L_2$, $Z_8$ and $SW_4$ constitute the feed-back loop of operational amplifier $Z_9$. Signal 31 which is proportional to the effect of the intermittent energy source upon $D_2$ is forced by the feed-back system towards the value of signal 30 which in turn corresponds to the effect of the other continuous energy source upon $D_2$. Therefore, the voltage $V_2$ applied to controlled $L_2$ is proportional to the output energy of $L_1$.

While I have shown and described the preferred forms of the present invention and have suggested modification therein, other changes and modifications may be made, within the scope of the appended claims, without departing from the spirit and scope of this invention.

What is claimed is:

1. In the control and measurement of a physical parameter $P_X$ in response to a voltage controlled energy source, an apparatus for ratiometrically measuring $P_X$ in a particular setting $S_X$ by comparison to the value $P_R$ obtained for such parameter in a reference setting $S_R$, which comprises:

two voltage controlled energy sources $L_1$, $L_2$;

a sensor $D_1$ exposed to the combined effect of $L_1$ and $L_2$, and having an electrical output signal proportionally responsive to the combined powers of $L_1$ and $L_2$;

a sensor $D_2$ exposed to the effect of $L_1$ through $S_X$ and to the effect of $L_2$ through $S_R$, having an electrical output signal proportionally responsive to the combined effects of $L_1$ through $S_X$ and of $L_2$ through $S_R$;

means for impressing a square-wave-shaped voltage supply $V_2$ to $L_2$;

means for impressing a continuous voltage supply $V_1$ to $L_1$;

means for regulating the voltage supply impressed upon one of said energy sources in proportion to the intensity of the effect of the other energy source upon $D_2$;

means for detecting the output signal amplitude $U_{T_P}$ of $D_1$ during the peak period $T_P$ of $V_2$ and the output signal amplitude $U_{T_V}$ of $D_1$ during the valley period $T_V$ of $V_2$. whereby $P_X$ can be determined from the equation:

$$P_X = (P_R U_{T_V}/U_{T_P} - U_{T_V})$$

2. The apparatus claimed in 1, wherein said means for regulating comprises:

means for separating the output signal Y of $D_2$ into two wave-forms corresponding to the intensity of the effect of $L_1$ and to the intensity of the effect of $L_2$ respectively upon $D_2$;

means for comparing the amplitude of said two wave-forms; and means, responsive to the output of said means for comparing, for controlling the voltage supply impressed upon one of said energy sources.

3. The apparatus claimed in claim 2, wherein said means for separating comprises:

means for detecting the output signal amplitude $Y_{T_P}$ of sensor $D_2$ during the peak period $T_P$ of $V_2$ and the output signal amplitude $Y_{T_V}$ of sensor $D_2$ during the valley period of $T_V$ of $V_2$; and means for generating a square-wave signal W having a maximum positive excursion $W_P$ during $T_P$ where $W_P = 3 (Y_{T_P} - Y_{T_V})$;

said means for comparing comprises: means for summing the two signals Y and W.

4. The apparatus claimed in claim 3, wherein said means for generating W comprises:

means for differentiating signal Y;

means for amplifying said differentiated signal by a gain $G_1$, where $G_1 = -6$;

means for suppressing the positive excursion of the resulting amplified signal.

5. The apparatus claimed in 2, wherein said means for separating comprises:

an input non-inverting operational amplifier $Z_1$ having its input connected to the output of $D_2$;

an inverting operational amplifier $Z_2$ having a gain $G_1$, where $G_1 = -6$;

a capacitor linking the output of $Z_1$ to the input of $Z_2$; and a diode means in the feed-back loop of $Z_2$ to suppress its positive output excursion;

said means for comparing comprises:

a summing junction having two inuts;

a linking resistor between the output of $Z_1$ and one of the summing junction inputs;

a linking resistor between the output of $Z_2$ and the other summing junction inputs; and an integrating operational amplifier $Z_3$ having its input connected to the summing junction;

said means for controlling comprises:

a cathode follower circuit driving $L_1$ having its input connected to the output of $Z_3$.

6. The apparatus claimed in 2, wherein said means for separating comprises:

means for generating a negative continuous signal having an amplitude A proportional to the output signal amplitude $Y_{T_P}$ of $D_2$ during the peak period $T_P$ of $V_2$;

means for generating a positive continuous signal having an amplitude B proportional to the output signal amplitude $Y_{T_V}$ of $D_2$ during the valley period $T_V$ of $V_2$; said means for comparing comprises:

means for summing B with $\frac{1}{2}$ A.

7. The apparatus claimed in 6, wherein said means for generating a negative signal comprisis:

sample-and-hold circuit $H_1$;

an inverting operational amplifier combined with $H_1$; and means for applying $T_{T_P}$ to $H_1$. said means for generating a positive signal comprises:

a sample-and-hold circuit $H_2$;

a non-inverting operational amplifier combined with $H_2$; and means for applying $Y_{T_P}$ to $H_2$.

8. The apparatus claimed in 7, wherein said means for applying $Y_{T_P}$ to $H_1$ comprises:

switch means for connecting the output of $D_2$ to $H_1$ during $T_P$; and said means for applying $Y_{T_V}$ to $H_2$ comprises switch means for connecting the output of $D_2$ to $H_2$ during $T_V$.

9. The apparatus claimed in 2, wherein said means for separating comprises:

means for generating a square-waved signal SWG;

an amplifier $Z_8$ connected to the output of $D_2$, having a gain $G_{T_P}$ during the peak period $T_P$ of SWG where $G_{T_P} = \frac{1}{2} G_{T_V}$;

sample-and-hold means $H_3$ connected to the output of $Z_8$;

switch means controlled by SWG for disconnecting $H_3$ during $T_V$; and switch means controlled by SWG for changing the gain controlling feed-back loop characteristics of $Z_8$. said means for comparing comprises:

a differential input amplifier $Z_9$ having its non-inverting input connected to the output of said sample-and-hold means;

switch means controlled by SWG for applying the output of $Z_8$ to the inverting input of $Z_9$ during $T_V$ said means for controlling comprises:

a cathode follower circuit controlled by the output of $Z_9$ during $L_2$.

10. The apparatus claimed in 9, wherein the inverting input of $Z_9$ is permanently connected to a saturating voltage through a resistor; and said sample-and-hold means comprises a capacitor connected between the non-inverting input of $Z_9$ and the common.

* * * * *